United States Patent Office 3,565,569
Patented Feb. 23, 1971

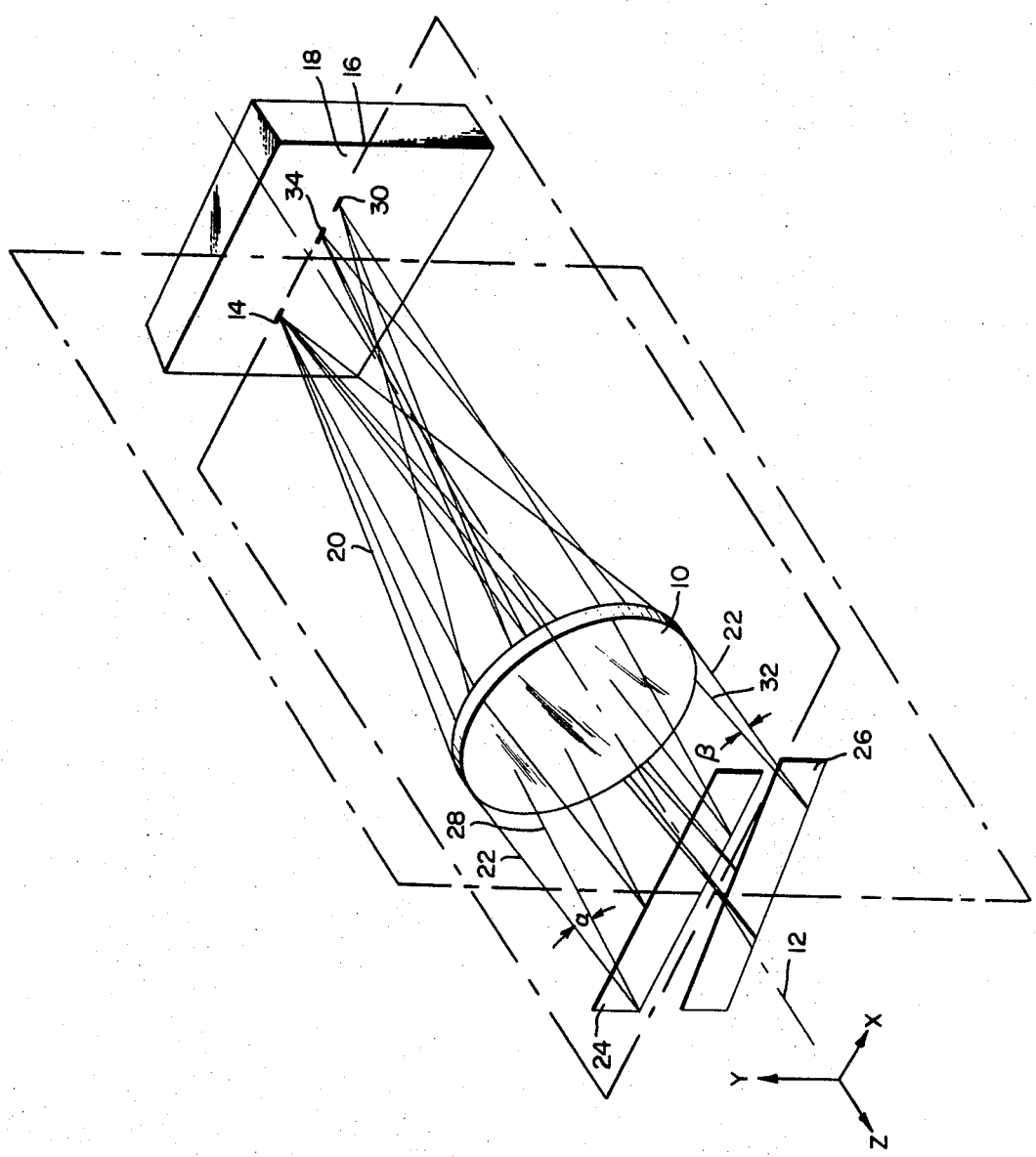

3,565,569
FOCUS DETECTOR
Leonard Larks, West Covina, Calif., assignor to Hycon Mfg. Company, Monrovia, Calif.
Original application Nov. 26, 1965, Ser. No. 509,963. Divided and this application Jan. 22, 1968, Ser. No. 699,690
Int. Cl. G01j 1/00
U.S. Cl. 356—122                        7 Claims

ABSTRACT OF THE DISCLOSURE

A method and apparatus for determining the focal status of an image producible by a camera, and for locating the camera's primary focal plane. An illuminated target positioned in the vicinity of the camera's primary focal plane and a pair of mirrors in a lens cap are utilized in combination with the camera lens in an autocollimation configuration, and individually viewable double images are produced having a vertical separation indicative of image focus.

---

This is a division of application Ser. No. 509,963, filed Nov. 26, 1965.

This invention relates to focus detecting systems, and more particularly, to a method and apparatus for testing the focal status of an image in a camera.

Although the present invention has particular application for testing the quality of focus of an image located at a plane which is coincident to the emulsion plane of the film within an aerial camera, it can be utilized for testing the focal status of an image producible at a predetermined image plane of any optical imaging system. Furthermore, apparatus according to the present invention can be utilized for locating the primary focal plane of any optical imaging system.

Briefly described, the present invention is a modification of the Scheiner imaging system described in the above referenced parent application for patent, providing an autocollimation configuration thereto.

It is a well known principle that collimated light incident on a lens system is brought to a focus in the primary focal plane of that system. By the present invention, an illuminated target is adapted to be positioned to one side (for example, horizontally) of the lens optical axis and in a predetermined image plane, i.e. the plane at which it is desired to check the quality of focus of an image producible by the lens system. In a camera, this predetermined plane is coincident with the emulsion plane of the film, which is at or near the primary focal plane of the lens system.

When the illuminated target is at the primary focal plane of the lens system, the light therefrom is incident on the entire lens area and emerges from the lens system as a collimated bundle horizontally angled with respect to the optical axis. The light emerging from the lens system is then reflected back through the lens system in such a manner that the image of the target producible by the lens system, is seen as a pair of horizontally aligned images in the primary focal plane.

If the target is not positioned in the primary focal plane, however, the double images separate vertically in the plane of the target. The amount of the vertical separation of the double images corresponds to and is representative of the distance by which the plane of the target is non-coincident with the primary focal plane of the lens system. Means for receiving the double images are provided coplanar with the illuminated target, which plane is hereinafter referred to as a "reference plane."

In a preferred embodiment of apparatus according to the present invention, the image receiving means is a translucent screen horizontally aligned with the illuminated target but horizontally displaced therefrom with respect to the optical axis of the lens system. A pair of images of the target is therefore displayed on the translucent screen, and can be viewed by an observer positioned on the reverse side of the screen, for detecting the location of the images relative to one another and hence their vertical separation.

In the preferred embodiment, the double images are formed by a pair of plane mirrors positioned to intercept two portions of the light emanating from the front of the lens system. The two intercepted light portions are separated by a third, non-intercepted portion, which emerges from the lens system with horizontal boundaries positioned substantially equally on either side of the optical axis of the lens system in the vertical direction.

For example, the mirrors can be a pair of vertically separated rectangles, each rectangle having its long dimension orthogonal to the vertical direction. With respect to the reflected light, this mirror arrangement produces the same results as the horizontally occluded central area of the Scheiner lens.

Horizontal separation of the double images is provided by positioning the reflective surfaces of the mirrors to be non parallel, or slightly skewed with respect to each other. Since the mirrors act in collimated light, the slight difference in the planes of the two mirrors has no visible effect on the focal quality of the returned images.

It is an object of the present invention to provide a method and apparatus for testing the focal status of an image producible at a predetermined image plane of an optical imaging system.

It is another object of the present invention to provide a method and apparatus for locating the primary focal plane of an optical imaging system.

It is a further object of the present invention to provide a method and apparatus for checking the quality of focus of an image producible at the film emulsion plane of a camera.

It is yet another object of the present invention to provide a focus checking apparatus for quickly and easily determining whether a camera image is properly focused.

It is a still further object of the present invention to provide a method and apparatus for checking the focal status of high resolution, fixed focus cameras, when time and facilities for collimation by normal means are not available.

The novel features which are believed to be characteristic of the invention, together with further advantages thereof, will be better understood from the following description considered in connection with the accompanying drawing in which a preferred embodiment of the invention is illustrated by way of example. It s to be expressly understood, however, that the drawing is for the purpose of illustration and description only, and is not intended as a definition of the limits of the invention.

The drawing is a perspective view of a preferred embodiment of a focus tester according to the present invention, diagrammatically showing the focus testing method of the invention.

Turning to the drawing, a lens 10 is shown with an optical axis 12 indicated. For simplicity, the lens 10 is shown as a single lens but it is understood that lens 10 may represent the lens system of any optical imaging device.

For convenience of description, a reference coordinate system is shown in the drawing, having a z-axis coinciding with the optical axis 12, and x and y axes mutually orthogonal to the z axis and to each other. For clarity, a pair of coordinate planes intercepting the optical axis 12 are indicated by broken lines. When the lens 10 is the lens system of a camera (not shown), the optical axis 12 is intercepted by a predetermined plane, or a plane which is then described by the position of the emulsion plane of the film. With respect to the lens 10, the predetermined plane is positioned to the right of the lens 10, in a direction opposite the $z$ direction, while the front of the camera would be to the left of the lens 10 along the optical axis 12 in the $z$ direction.

A target 14 which is adapted to be illuminated, is located in the same plane as a translucent screen 16. This plane is referred to as a "reference" plane 18 and the target 14 can be an illuminated slit area of the translucent screen 16. Of course, the target 14 can be provided by any light source in the reference plane, such as a well defined diffuser, illuminated by a lamp. As shown, the target 14 is an illuminated slit in the reference plane 16 displaced a short distance from the optical axis 12 opposite the $x$ direction as defined in the drawing.

If the reference plane 18 is positioned to coincide with the camera primary focal plane, the light rays 20 emanating from the illuminated target 14 and intercepting the lens 10, will be refracted by the lens 10, emerging as collimated rays 22 directed substantially in the $z$ direction with a small component in the $x$ direction.

A first portion of the collimated light emerging from the lens 10 is reflected back through the lens 10 by means of a first plane mirror 24, while a second portion of the collimated light 22 is reflected back through the lens 10 by means of a second plane mirror 26. The mirrors 24, 26 are adapted to be positioned in front of the lens 10, such as by mounting the mirrors in a lens cap (not shown) which is adapted to be positioned in front of the lens 10.

The mirrors 24, 26 are arranged with respect to one another such that they are separated in the $y$ direction, causing non-reflection of a central "band" (extending in the $x$ direction) of the collimated light 22 emanating from the lens 10. For example, a first reflected light ray 28 (reflected by the first mirror 24) is refracted by the lens 10 to form a first image 30 of the illuminated target 14, on the translucent screen 16. Similarly, a second reflected light ray 32 (reflected by the second mirror 26) is refracted by the lens 10 to form a second image 34 of the illuminated target 14, on the translucent screen 16.

It is necessary that the translucent screen 16 extend only over an area in the reference plane 18 sufficient to receive the double images 30, 34. Each of the double images 30, 34 can be independently viewed on the reverse side of the translucent screen 18, since the two images 30, 34 are displaced with respect to one another by a predetermined distance in the $x$ direction. This displacement is accomplished by arranging the two mirrors 24, 26 such that they are slightly skewed to be non-parallel with respect to one another. For example, the surface of the first mirror 24 can be orthogonal to the optical axis 12, parallel to the $xy$ plane, while the surface of the second mirror 26 can be slightly rotated about the $y$ axis. Alternatively, both the first and second mirrors 24, 26 can be slightly rotated about the $y$ axis but by different amounts. In either case, the respective angles of reflection $\alpha, \beta$ differ from one another.

The target 14 and the double images 30, 34 can be located on the same side of the optical axis 12, if desired. In order to avoid the presence of aberrations, however, it is preferred that the illuminated target 14 and the double images 30, 34 be located on opposite sides of the optical axis 12 although it is a matter of choice on which side the target 14 is placed. For greater refinement, an imaginary point midway between the double images 30, 34 should be displaced from the optical axis 12 (in the $x$ direction) by the same amount that the center of the illuminated target 14 is displaced from the optical axis 12 (opposite the $x$ direction).

When the reference plane 18 is positioned to coincide with the primary focal plane of the lens 10, the double images 30, 34 are colinear in the $x$ direction, or in horizontal alignment. However, when the reference plane 18 is not coincident with the primary focal plane, the double images 30, 34 will separate in the $y$ direction. For example, if the reference plane 18 is moved in the $z$ direction from the primary focal plane, the first image 30 will move in the $y$ direction by the same amount that the second image 34 moves opposite the $y$ direction.

Similarly, if the reference plane 18 is moved opposite the $z$ direction with respect to the primary focal plane, the first image 30 will move opposite the $y$ direction by the same amount that the second image 34 moves in the $y$ direction. The presence of a $y$ direction separation between the two images 30, 34 indicates that the reference plane 18 is not positioned at the primary focal plane. The direction along the optical axis 12 by which the reference plane 18 is displaced from the primary focal plane is indicated by which of the images is placed in the $y$ direction.

To use the present device in order to test a camera for focal status, the camera magazine (containing the film and the film platen) is removed from the camera and the target 14 and translucent screen 16 is fitted to the camera such that the reference plane 16 coincides with the predetermined film emulsion plane. For example, a mounting plate (not shown) containing the target 14 and the translucent screen 16 for viewing the double images 30, 34, can be utilized. The mounting plate can be attached to the back of the lens cone, such that the reference plane 18 coincides with the predetermined plane.

A lens cap (not shown) containing the pair of mirrors 24, 26 is then attached to the camera in front of the lens 10. When the target 14 is illuminated, the presence of a $y$ direction separation between the double images 30, 34 indicates that the lens is out of focus, and the amount of such separation indicates the severity of the defect in focus.

In order to locate the position of the primary focal plane, the reference plane 18 can be moved along the optical axis 12 until the double images 30, 34 are in horizontal alignment with no relative displacement in the $y$ direction. The distance and direction along the optical axis 12 by which the reference plane 18 was moved from the predetermined plane indicate the distance and direction by which the image at the predetermined plane is out of focus, which, in turn, indicate the distance and direction by which the lens must be moved in order to correct the defect in focus. Obviously, the reference plane 18 may be held stationary at the predetermined plane and the lens cone moved along the optical axis 12 until the images are colinear.

Thus, there has been shown a method and a single embodiment of apparatus for testing the focal status of an image producible at a predetermined image plane of an optical imaging system, and for locating the system's primary focal plane. The method is simple to practice, and the apparatus is of simple construction, while permissive of rapid and reliable testing and adjusting of focus of an image produced by any optical imaging system.

Other embodiments of the present invention and modifications of the embodiment herein presented may be developed without departing from the essential characteristics thereof. Accordingly, the invention should be limited only by the scope of the claims listed below.

What is claimed as new is:

1. Apparatus for use with an optical system having an optical axis to detect the deviation from optimum focus of an image with respect to a predetermined plane orthogonal to the optical axis, said apparatus comprising:

(a) image forming and doubling means having a reference plane orthogonal to the optical axis adapted to be coincident with the predetermined plane, said means being operable to produce from the optical system image, double images at said reference plane, said double images having a separation in a first directional orthogonal to the optical axis related to the displacement of the optical system image from the optical system predetermined plane, said double images being laterally separated by a predetermined distance in a second direction orthogonal to said first direction and the optical axis; and (b) image receiving means positioned with respect to said image forming and doubling means for displaying said double images at said reference plane;

whereby, separation in said first direction of said double images as displayed at said reference plane corresponds to deviation from optimum focus of the optical system image at the predetermined plane.

2. The apparatus of claim 1, above, wherein (a) said image forming and doubling means includes a pair of plane mirrors separated in said first direction and adapted to be positioned adjacent to the optical system, said mirrors being slightly skewed with respect to each other, for reflecting light emanating from the optical system back through the optical system to produce respectively said double images mutually separated in said second direction at said reference plane; and (b) said image receiving means includes a translucent screen positioned at said reference plane for displaying said double images so that the first direction separation of said double images can be visually determined.

3. Apparatus for use with a camera having an optical axis to detect the deviation from optimum focus of an image with respect to a predetermined image plane, said apparatus comprising:

(a) image generating and display means adapted to be positioned at the predetermined image plane of the camera, including a light source and a translucent screen;

(b) lens cap means adapted to be positioned in front of the camera lens, including a pair of plane mirrors for reflecting light rays emanating from the camera lens, said light rays being provided by said image generating means, said rays being reflected through the lens to produce double images respectively corresponding to the mirrors of said pair and separated in a first direction orthogonal to the optical axis, said images having a separation in a second direction orthogonal to said first direction and the optical axis and related to the displacement of a focused camera image with respect to the predetermined image plane;

whereby, said double images are displayed on said translucent screen, permitting second direction separation of said double images to be visually determined, the presence of said separation indicating a deviation from optimum focus of the camera image producible at the predetermined image and the absence of said separation indicating optimum focus of the camera image at the predetermined plane.

4. Apparatus according to claim 3, above, wherein said light source and said translucent screen are respectively positioned on opposite sides of the optical axis of the camera in said first direction.

5. A method for detecting the focal status of an image producible at a predetermined plane by a lens system comprising the steps of:

(a) providing an illuminated target at a reference plane coincident with the predetermined plane, said target being displaced from the lens system optical axis in a first direction and providing light rays intercepting the lens system to produce therefrom substantially collimated light;

(b) reflecting first and second portions of the collimated light back through the lens system, said reflected portions separated at the lens system in a second direction orthogonal to both said first direction and said optical axis, and each of said portions having a different angle of reflection to produce a pair of images of said target at said reference plane having a separation in said second direction related to the distance by which said reference plane is removed from the lens system primary focal plane; and (c) displaying said pair of images at said reference plane, to produce a visible indication of said second direction separation.

6. The method of claim 5 above, further including the step of:

moving said reference plane from the predetermined plane along the lens system optical axis until said displayed pair of images are aligned in said first direction, representing coincidence of said reference plane and the lens system primary focal plane and indicating the distance by which the predetermined plane is displaced from the primary focal plane.

7. The method of claim 5, above, further including the step of:

moving the lens system along its optical axis until said displayed pair of images are aligned in said first direction, representing coincidence of the predetermined plane and the optical system primary focal plane.

References Cited
UNITED STATES PATENTS

| | | | |
|---|---|---|---|
| 3,323,417 | 6/1967 | Grey et al. | 356—125 |
| 3,375,754 | 4/1968 | Kugler | 356—124 |

RONALD L. WIBERT, Primary Examiner

P. K. GODWIN, Assistant Examiner

U.S. Cl. X.R.

356—123, 125; 95—44